Jan. 3, 1961  A. O. LUNING  2,966,806
ANTIBACKLASH GEARS
Filed July 28, 1958  2 Sheets-Sheet 1

INVENTOR
Alfred O. Luning

Jan. 3, 1961 A. O. LUNING 2,966,806
ANTIBACKLASH GEARS

Filed July 28, 1958 2 Sheets-Sheet 2

INVENTOR
Alfred O. Luning

United States Patent Office 2,966,806
Patented Jan. 3, 1961

2,966,806

ANTIBACKLASH GEARS

Alfred O. Luning, Riverdale, Md.
(2611 S. 8th St., Arlington 4, Va.)

Filed July 28, 1958, Ser. No. 751,209

15 Claims. (Cl. 74—409)

This invention relates to antibacklash gears. More particularly it relates to an antibacklash gear that may be used in a gear train operating simultaneously against two other conventional gears. Thus an object of this invention is to provide an antibacklash gear which, in an application normally requiring two conventional antibacklash gears, will conveniently replace one of them. This invention is directly related to pending application 33,342, Antibacklash Gear of the inventor wherein basic principles of the present invention are applied to an antibacklash gear comprising two matched gear elements in lieu of three thereof as shown herein, and wherein the pending application incorporates basic and salient features of the present invention.

Another object of this invention is to provide an antibacklash gear that has an unique spring-loading device with salient improvements and advantages over the present art.

Other objects of the invention will become apparent from the description following and the accompanying illustrations.

Prior art reveals antibacklash gears, or noiseless, non-rattling gears as they are sometimes referred, to be comprised of essentially two gears having identical tooth form and pitch diameter. One of these gears is formed integral with or attached to a hub portion which fits over a shaft; the other gear is rotatably mounted over the hub portion and positioned in close proximity to the face of the first gear. Various means are employed to contain the latter gear in close proximity to the former. Also various means have been devised to cock the two gears relative to each other when the pair is interposed in a gear train in order that an opposing torque be exerted between them. The two gears thus combined are sometimes referred to as split gears, and the assembly as a split gear assembly.

It is generally known that a split gear assembly can operate enmeshed against only one conventional gear in a gear train. Obviously in instances where one gear is enmeshed between two other conventional gears, and it is desired to eliminate the backlash or noise or both through the three of them it becomes necessary to employ two antibacklash gear assemblies in the central or intermediate position; and to accomplish this one split gear assembly is displaced from the other upon the same shaft or upon a second shaft in alignment with the first.

The antibacklash gear of this invention however is comprised of three matched gear elements arranged face-to-face on a hub. By matched gears is meant that the three gear elements have the same pitch diameter and tooth form and a common central axis wherein they may be simultaneously and functionally enmeshed with one and with two other gears having a corresponding mating tooth form. The invention is singular in that it effectively combines two conventional antibacklash gear assemblies into one, and in so doing eliminates one of the split gears of the conventional assemblies. Thus, this invention obviates the need for two conventional antibacklash gear assemblies in the staggered arrangement ordinarily required in the above cited instance. It follows that obvious advantages of the triple split gear of this invention are savings in manufacturing time, tools, labor, material and costs. Another important advantage is the possibility of effecting a much more compact gear train. It is further to be appreciated that in gear train design there well may be instances of space limitations in which two conventional split gear assemblies could not at all be used side by side as explained in the aforedescribed instance even if desired, whereas the triple split gear assembly of this invention would not only be suitable but ideal.

The more conventional antibacklash gear designs employ a coiled compression spring, or a coiled tension spring which is inserted between matched elongated holes cut into the sides of the gears. Such designs require, compared to this invention, much more machining of the gears to accommodate the coil springs and greater effort to design the springs and make them; costs for material and labor involving the gears and their spring cocking devices will be greater, and the designs themselves, as will be seen, are not as flexible, or adaptable to change as is this invention.

Figure 1:
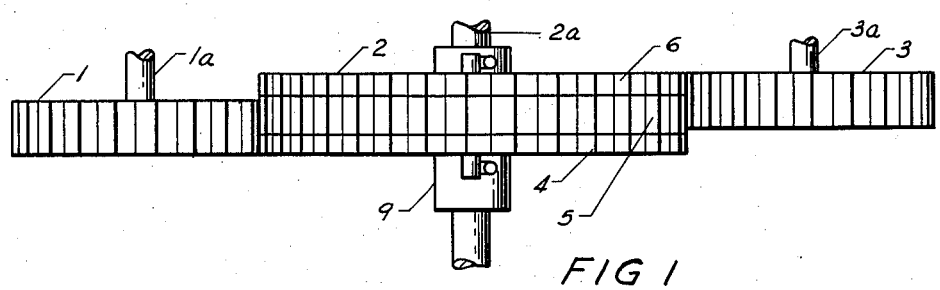
Fig. 1 illustrates three separate gears enmeshed together, the central gear 2 being the antibacklash gear of this invention.

In Fig. 1, gear 1 is a conventional spur gear mounted over shaft 1a. Gear 2, the antibacklash gear of this invention, is shown enmeshed with 1. Gear 2 is comprised of three component gears 4, 5, and 6 flat and plate-like in shape each having the same pitch diameter and tooth form, and arranged contiguously face-to-face one against the other through circular holes in their central position, upon a cylindrical hub portion 9, the entire assembly being secured to shaft 2a by setscrew 10 radially placed in one end of 9, Fig. 2. Gear 3, also enmeshed with gear 2, is another conventional spur gear mounted upon shaft 3a.

Figures 2, 3, 4:
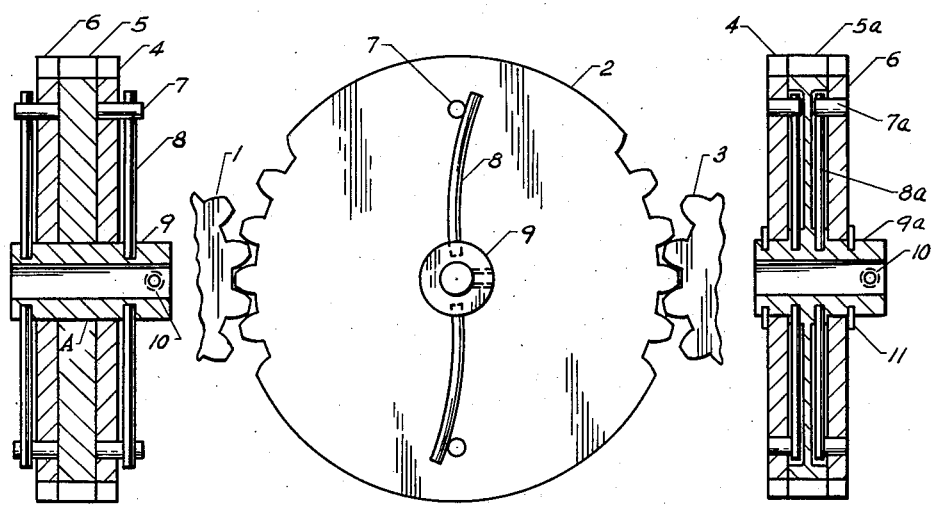
Fig. 2 is a sectional view of Fig. 3 illustrating further the arranged components of gear 2.
Fig. 3 is an elevation of gear 2 of Fig. 1.
Fig. 4 is a sectional view of another embodiment of the gear of this invention.

In Figs. 2 and 3, respectively a cross section and an elevation of gear 2, the central gear element 5 is fixedly secured at A to hub portion 9 by any of various means such as staking, brazing, keying, etc. Gear 5 could also be made integral with 9 at A. Gear elements 4 and 6 are rotatably mounted on hub 9 on each side of gear 5. Pins 7 cylindrical in shape are fastened normal to gears 4 and 6 and protrude outwardly to engage straight, round wire cantilevered springs 8 secured radially in hub 9. In Fig. 2, springs 8 secure gears 4 and 6 from axial movement on hub 9. It can be seen from the construction of the gear assembly that when gear 2 is interposed in a train and the elements 7 and 8 are cocked in coacting engagement, 8 behind 7 as illustrated in Figs. 1 and 3, that independent, opposing torques will exist between gear elements 4 and 5, and gear elements 5 and 6. This torque can be adjusted to meet the load conditions incident upon the gear train by properly orienting gears 4 and 6 relative to gear 5 prior to installing the antibacklash gear assembly in the train. By proper orientation is meant that pins 7 in gears 6 and 4 be displaced angularly out of radial alignment with springs 8 prior to engaging gear 2 with gears 1 and 3. A setscrew 10 in hub 9 is provided to secure the assembly to a shaft.

In Fig. 1, gears 1 and 3 are positioned to mesh with two only of the three component gear elements in the antibacklash gear; namely, gear 1 with elements 4 and 5, and gear 3 with elements 5 and 6. As so arranged it can be seen that backlash will be eliminated through all of the enmeshed gears comprising the train.

Fig. 4 illustrates another embodiment of the gear of this invention, the chief difference from the previously described embodiment being that cylindrical pins 7a and round wire cantilever springs 8a are concealed internally between the three component gear elements 4, 5a and 6. Central gear 5a has a narrow web to permit introduction of spring elements 8a between 4, 5a and 6, and to permit fixedly securing 8a to hub 9a; 5a is shown integral with hub 9a. Gears 4 and 6 are rotatably mounted over hub 9a in manner similar to Fig. 2. Two retaining C-rings 11 contain gears 4 and 6 upon hub 9a securing it from axial movement thereon. Pins 7a are tightly secured to 4 and 6 by press-fitting them in place therein, and engage cantilever springs 8a radiating outwardly from and secured to hub 9a. The principle of cocking the assembly to produce a torque between the gears is similar to that of the prior embodiment.

Figures 5, 6:
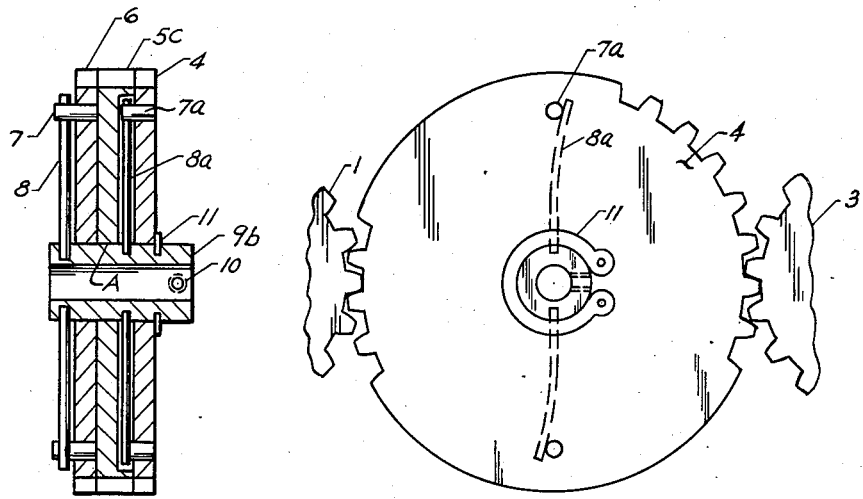
Fig. 5 is a sectional view of Fig. 6.
Fig. 6 is a third embodiment of this invention.

Fig. 6 is a third embodiment of this invention in which the features of embodiment Fig. 2, and embodiment Fig. 4 are combined to provide an antibacklash gear of three gear elements in which the springs and coacting pins of one of the rotatably-mounted gear elements are exposed like that shown in Fig. 2, while the springs and coacting pins of the second rotatably-mounted gear are concealed in the manner shown in Fig. 4.

In Figs. 5 and 6, the engagement in a train of the antibacklash gear shown with gears 1 and 3 is identical to that of Fig. 3 hereinbefore explained. Rotatably-mounted gear 6, pins 7 and springs 8 are identical to the same parts of Fig. 2, and function in the same manner. Also, rotatably-mounted gear 4, pins 7a, springs 8a, retaining ring 11 and setscrew 10 have their exact counterparts in embodiment Fig. 4 hereinbefore explained. Center gear 5c is fixedly secured to hub 9b at A. Gear 5c contains a recessed portion in the right face thereof to accommodate radiating cantilever springs 8a fixedly secured to hub 9b. In Fig. 6, the springs 8a, in hidden outline, are shown deflected in active engagement with pins 7a behind gear 4.

Fig. 2 illustrates the preferred embodiment of this invention. In all embodiments shown the projecting pins extend normal from the faces of the rotatably mounted gears, and the springs engage the pins normal to the sides thereof wherein, by virtue thereof, no axial forces are introduced in the production of torque between the gears from the engagement.

The straight cantilever springs used in this invention may be made from a variety of metals, alloys and other non-metallic materials possessing elastic properties, and function quite satisfactorily. Also the springs may have unlimited cross-sectional shapes—round, square, flat, tapered, etc. Such materials need in no way be restricted to those having a particularly high modulus of elasticity such as especially treated steel wire, bar or strip manufactured expressly for spring applications to withstand severe deformation, because the spring elements of this invention need undergo only small displacement to produce an effective torque between the component gear elements. No special forming tools are needed to wind or to shape a spring of the cantilever type used herein, and spring calculations may be quickly made with a high degree of certainty.

Virtually all devices used to create an opposing torque between the split gears of a conventional antibacklash gear employ springs which, by virtue of their construction, or application give rise to undesirable force components in an axial direction. These extraneous force components always increase the friction to be overcome in the functioning of the gears and for optimum results should be eliminated completely. For example, the coiled tension spring used in conventional designs, besides exerting an opposing torque between the component gears, also exerts an axial force between them that makes the gears rub together at their mating side surfaces. Obviously such springs must be designed sufficiently strong to overcome these extraneous friction forces produced by their oblique setting respecting the gear axis, as well as the primary loads incident upon the gear train. Coiled compression springs similarly used cause axial separation of the gears resulting in extraneous axial force components and friction at the hub where the gears are held together. In other types of springs where spring ends are hooked over and inserted into holes in the split gears or are bent around pins projecting from the gears, the hooked ends will always twist on cocking, and by virtue of this twist exert axial force components causing the component gears to rub against each other. This rubbing friction, as explained above, must be overcome by the spring in its effort to produce a counter torque between the gear elements of the assembly; hence this extraneous force must be taken into account in designing the springs that they be adequate for the application in mind. Thus, this is one factor reducing the efficiency of antibacklash gears which is not prevalent in the gear of this invention.

In delicate recording instruments employing antibacklash gears, sensitive and delicately balanced springs are obviously highly desired. Numerous instances are known however in which such gears ceased to function altogether in their antibacklash capacity primarily because the friction produced between them by their twisting springs was too much for the springs to overcome. The need for, and the importance of reducing extraneous axial friction between the gear elements of an antibacklash gear is of paramount importance particularly in delicate applications demanding close attunement of the spring cocking device used in them.

The invention described herein using cantilever springs projecting radially from the gear hub introduces pure torque between the split gears of the assembly. Since theoretically there are introduced no axial force components there is no rubbing friction arising from this source to be overcome; and because of the total absence of such friction, the opposing torque necessary between the split gears can be much more accurately attuned to a particular application, with the result that the life of the gears will be substantially increased due to the smaller resulting loads and wear incident upon the gear teeth. Moreover, the torque or power necessary to drive an antibacklash gear assembly in a train will be proportionately lessened due to the lighter spring loading to which the gear may be adjusted when axial friction between the gears is absent. That is to say, in the latter instance, there will exist less tooth-to-tooth friction between the antibacklash gear and the gears engaged with it. This is due to the fact that the opposing tooth forces between the two gears comprising the antibacklash gear need create less force against the lands of the teeth on the engaged gear.

It will be apparent from the figures that the triple split gears of the antibacklash gear assembly can be spring-loaded or cocked in both the clockwise and counterclockwise directions. This feature makes possible wear of both sides of the teeth of the split gears as well as the gears enmeshed with them, a feature not possible with numerous other types of antibacklash gears.

Another feature of this invention is that adjustments or variations of the torque exerted between the split gears can be readily achieved by forcibly bending back the spring elements beyond their elastic limit that by such deformation a new, different force be exerted against the mating pin projections when the gear is engaged. This method of effecting a change in the torsional spring rate between the gear elements has much merit. Consider that after assembly in a gear train it is desired to change the force between the split gears to accommodate a greater or lesser load incident upon the train. Disassembly of the antibacklash gear to reset the engaged teeth to take a new load might not be at all feasible, it can be appreciated. At best, considerable effort, time and expense might be entailed in such disassembly, depending upon the construction and accessibility of the mechanism using the gear. Thus, the antibacklash gear of this invention obviates by its construction the necessity for dissassembly from an enmeshed gear to effect a change in the torsional spring rate through its spring elements.

A further feature of this invention is that with a plurality of springs arranged about the hub various combinations of them may be cocked at a time to effect changes in the torsional spring rate of the assembly when engaged, while the uncocked spring elements, those remaining ready for use, stay secured in or integral with the gear hub at all times. Thus there is provided still another simple means to vary the torsional spring rate of the engaged assembly.

It can be appreciated that features of both embodiments illustrated might be combined advantageously without departing from the spirit of the invention.

Other possibilities are numerous with the spring cocking device used herein. For example, a virtually unlimited number of spring elements can be introduced into the cocking device by arranging them radially in parallel pairs, trios, etc., particularly with the embodiment of Fig. 2. In this way it would be possible to engage at one time more than one spring element behind each gear projecting pin thereby multiplying the spring rate of the assembly. It will be evident also to persons skilled in the art that spring elements of different material, sizes and shapes can be employed in the same gear and that these elements can also be arranged to engage projections oriented at a variety of radial and angular positions upon the gear.

Although the gear of this invention employs in its cocking device cantilever springs cooperating with pin projections, it is to be appreciated that innumerable other types of spring means now known and used in the art of antibacklash gears can readily be adapted to the gear of this invention. For instance, coiled tension and compression springs positioned within slots in the face of the component gears is well known in the art and can readily be applied to three contiguous gear elements such as used in this invention as well as to two such elements. Also readily adaptable to this invention is the rather common C-shaped spring that encircles the gear hub and engages bent ends within holes or around pins in the two component gear elements to create an opposing torque between them.

Having described my invention I claim:

1. A gear train comprising an antibacklash gear, two gears enmeshed with said antibacklash gear, said antibacklash gear comprising a trio of matched gears, one of said matched gears centrally positioned between the remaining two gears of said trio, said remaining two gears being thus the outermost gears of said trio; said centrally-positioned gear fixedly mounted on hub means fixed to a shaft for rotation therewith; said outermost gears rotatably mounted and secured from axial movement on said hub means, projections from the faces of said outermost gears, spring means cooperating with said projections and said hub to produce independently in clockwise and in counterclockwise directions a torque between said centrally-positioned gear and each of said outermost gears, said cooperation constituting cocking of said antibacklash gear.

2. An antibacklash gear as claimed in claim 1 in which said spring means is accessibly disposed that by virtue thereof is adaptable to be cocked, uncocked and adjusted precluding the necessity to disassemble said gear or to remove said gears from said train.

3. An antibacklash gear as claimed in claim 5 in which said projections and said spring means cooperating with said projections are secured to said antibacklash gear that by virtue thereof said antibacklash gear is adaptable to be cocked and adjusted in entirety and in part, and uncocked, in either clockwise or counterclockwise directions precluding the need to remove said projections and said spring means from said gear.

4. A gear train comprising an antibacklash gear, two gears enmeshed with said antibacklash gear, said antibacklash gear comprising a trio of matched gears one of said matched gears centrally positioned between the remaining two gears of said trio, said remaining two gears being thus the outermost gears of said trio; said centrally-positioned gear fixedly mounted on hub means fixed to a shaft for rotation therewith; said outermost gears rotatably mounted on said hub means and secured from axial movement thereon, a plurality of springs rigidly secured at one end thereof to said hub and radiating outwardly towards the periphery of said outermost gears; a plurality of projections extending from the faces of said outermost gears, each of said springs being engageable with at least one of said projections wherein said engagement constitutes cocking of said antibacklash gear in said train; each of said two gears enmeshed with said antibacklash gear positioned to engage two gears of said trio of gears said two gears being said centrally-positioned gear and one of said outermost gears.

5. A gear train as claimed in claim 4 in which said springs of said antibacklash gear are cantilever beams fixed at one end in said hub means.

6. A gear train as set forth in claim 4 in which said springs of said antibacklash gear are secured to said hub in an area accessibly disposed outside of said outermost gears, and in which said projections project from the exposed outer sides of said outermost gears of said trio of gears.

7. A gear train as claimed in claim 4 in which said antibacklash gear is adaptable to be cocked in the clockwise direction and in the counterclockwise direction respecting rotation of said gear, the direction of said cocking between said centrally-positioned gear and one of said outermost gears being independent of the direction of cocking between said centrally-positioned gear and the second of said outermost gears.

8. A gear train as set forth in claim 4 in which said springs of said antibacklash gear are secured to said hub in an area between said centrally-positioned gear and said outermost gears of said trio of gears, and in which said projections project inwardly toward said centrally-positioned gear from said outermost gears.

9. The gear train of claim 4 in which the engagement of said springs and said projections of said antibacklash gear is adaptable to adjustment by deformation of said springs that by virtue thereof the force of said engagement between said springs and said projections is thereby changed.

10. A gear train as claim in claim 4 in which said springs and said engaging projections of said antibacklash gear are accessibly disposed relative to said centrally-positioned gear and one of said outermost gears, and inaccessibly disposed relative to said centrally-positioned gear and the second of said outermost gears.

11. An antibacklash gear adaptable to simultaneous, independent functional engagement with a plurality of gears, said antibacklash gear comprising a plurality of matched gears, a first gear, a second gear and a third gear, said gears positioned one adjacent the other face-to-face on a hub and having a common axis, means to adapt and secure said hub to a shaft for rotation therewith, said second gear fixedly secured to said hub, said first and said third gears rotatably mounted on said hub at opposite sides of said second gear and secured from axial movement thereon, projections extending from the faces of and first and said third gears, spring means cooperable with said projections and said hub to produce independently torque between said first and said second gears, and between said second and said third gears.

12. An antibacklash gear as claimed in claim 11 in which said second gear and said hub are integral.

13. An antibacklash gear as claimed in claim 11 wherein said projections from the faces of said first and said third gears extend therefrom normal thereto, and wherein said spring means comprises cantilever springs secured at one end thereof to said hub radiating outward therefrom, said springs cooperating with said projections normal to the sides thereof wherein means is provided to produce said torque between said matched gears precluding axial forces upon said gears.

14. An antibacklash gear as claimed in claim 11 wherein said spring means cooperable with said projections and said hub to produce said torque between said matched gears is adaptable to engage said projections at two surfaces substantially opposite thereon to produce said torque in the clockwise direction, and in the counterclockwise direction respecting each of said gears wherein means is provided, in the enmeshment of said antibacklash gear with one and with two other gears, to effect engagement and wear of the entire mating surface of both faces of the teeth of said matched gears and said other gears enmeshed therewith.

15. An antibacklash gear adaptable to simultaneous, independent functional engagement with two gears, said antibacklash gear comprising three matched gears, a first gear, a second gear, and a third gear positioned one adjacent the other face-to-face on a hub having a common axis, means to adapt and secure said hub to a shaft for rotation therewith, said second gear fixedly secured to said hub, said first and said third gears having a hole in the central portion thereof rotatably mounted therethrough to said hub at opposite sides of said second gear and secured from axial movement thereon, pins projecting from the faces of said first and said third gears, cantilever springs secured at one end thereof to said hub radiating outward therefrom toward the periphery of said matched gears, said springs cooperable with said projections at two places substantially opposite thereon to produce an opposing torque independently between said second gear and each of said first and said third gears rotatably mounted on said hub, means to effect reversing the direction of said torque between said gears.

References Cited in the file of this patent

UNITED STATES PATENTS

| | | |
|---|---|---|
| 1,197,261 | Burke | Sept. 6, 1916 |
| 1,486,423 | Ericson | Mar. 11, 1924 |
| 1,648,715 | Bean | Nov. 8, 1927 |
| 2,663,198 | Cairnes | Dec. 22, 1953 |

FOREIGN PATENTS

| | | |
|---|---|---|
| 207,903 | Switzerland | Mar. 1, 1940 |